United States Patent Office 3,060,755
Patented Oct. 30, 1962

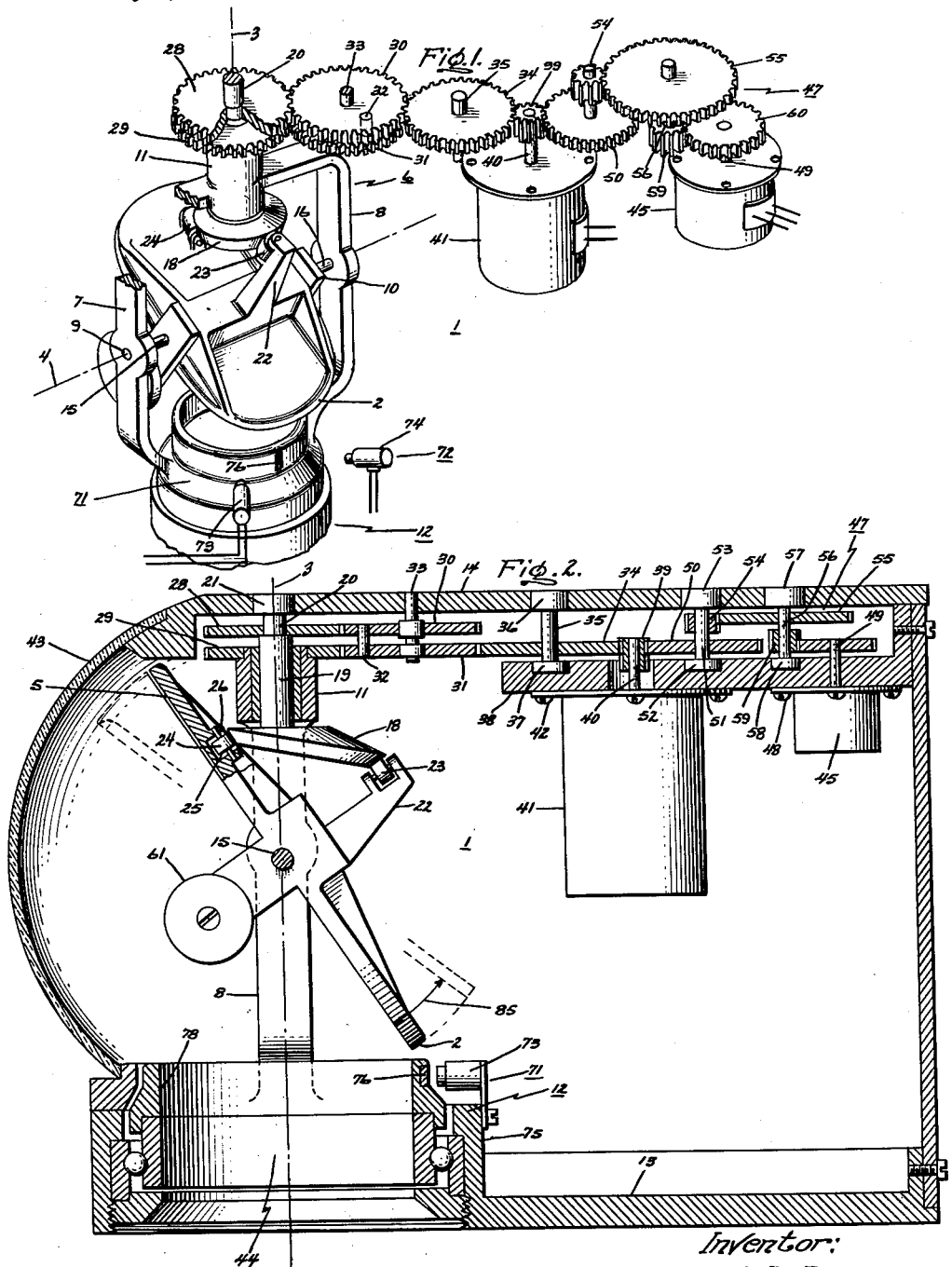

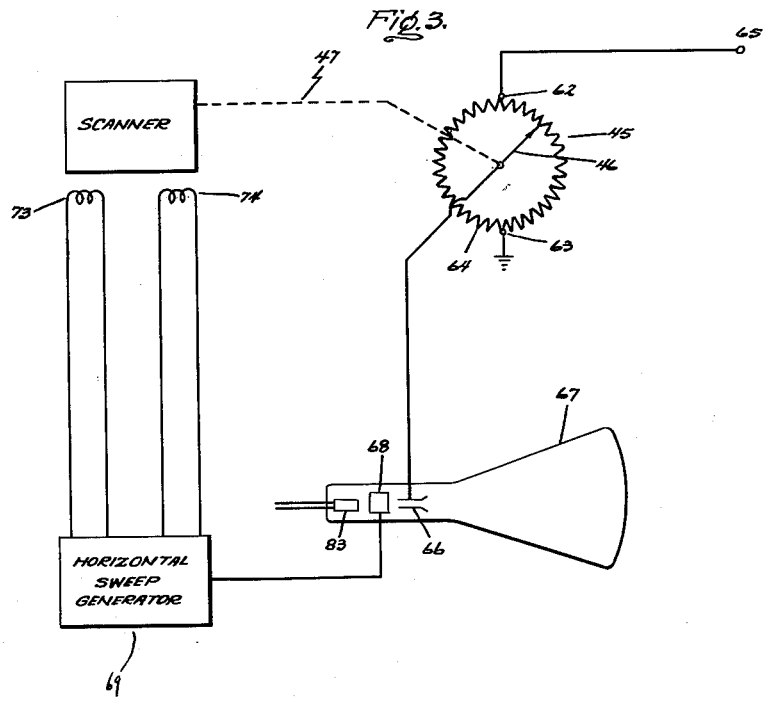
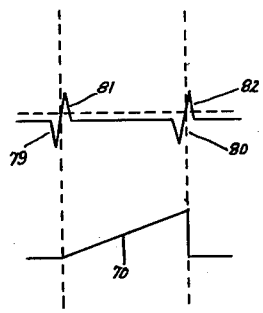

3,060,755
SCANNING APPARATUS
Kenneth L. De Brosse and John M. Lewis, Fort Wayne, Ind., assignors to International Telephone and Telegraph Corporation
Filed July 8, 1958, Ser. No. 748,560
13 Claims. (Cl. 74—22)

This invention relates to scanning apparatus for continuously rotating an element about a first axis and simultaneously imparting a limited nodding motion thereto about a second axis.

In certain systems for locating remote objects, it is desirable to provide scanning apparatus for continuously rotating a reflecting element about a first axis while simultaneously imparting a limited nodding motion to the element about a second axis at right angles to the first axis. Prior apparatus known to the present applicants for performing such scanning functions have been bulky and complex and have necessitated operation at relatively low scanning speeds in order to decrease vibratory effects; such prior apparatus has generally consisted of pushrods which oscillate and simultaneously nod the element either mechanically as by screws, connecting rods or cams, hydraulically or pneumatically.

It is therefore desirable to provide a scanning apparatus of the type here under consideration incorporating a simpler mechanism and being smaller in size and weight than prior apparatus. It is further desirable that the apparatus provide smooth operation, be extremely compact, and that the oscillating components be restricted to small mass and low speeds with high horizontal scanning rates nevertheless being provided. It is additionally desirable that the apparatus be inherently rugged.

It is therefore an object of this invention to provide improved scanning apparatus for continuously rotating an element about a first axis and simultaneously imparting a limited nodding motion to the element about a second axis at right angles to the first axis.

Another object of this invention is to provide improved scanning apparatus which is simpler and smaller in size and weight than prior apparatus.

A further object of this invention is to provide improved scanning apparatus incorporating the desirable features enumerated above.

Our invention, in its broader aspects, provides means rotatable about a first axis for supporting the scanning element for nodding motion about a second axis with cam means rotatable about the first axis and cooperating with the element being provided for imparting the nodding motion thereto. Means are provided connected respectively to rotate the element supporting means and the cam means at different speeds, such means being a differential gear train in the preferred embodiment of our invention. In accordance with one embodiment of our invention, means are provided for sensing the position of the scanning element in the plane of its nodding motion and means are provided for sensing the position of the scanning element in the plane of its rotation. In the preferred embodiment of our invention, the nodding motion sensing means provides a signal continuously responsive to the position of the scanning element in the plane of its nodding motion and the rotary motion sensing means provides two signals responsive respectively to two angularly spaced apart positions of the scanning element in the plane of its rotation. A cathode ray tube is further provided having vertical and horizontal deflection means, the vertical deflection means being coupled to the nodding motion sensing means and the horizontal deflection means being coupled to a sweep voltage generator which in turn is coupled to the rotary motion sensing means so that the horizontal sweep voltage is initiated and terminated responsive respectively to the two angular position responsive signals.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a fragmentary view in perspective, partly broken away, illustrating the improved scanning apparatus of our invention;

FIG. 2 is a side elevational view, partly in cross-section and partly broken away, further illustrating our improved scanning apparatus;

FIG. 3 is a schematic illustration showing the scanning element position sensing circuit of our invention; and FIG. 4 illustrates the horizontal sweep initiating and terminating action of the system of FIG. 3.

Referring now to FIGS. 1 and 2 of the drawing, our improved scanning apparatus, generally identified as 1, comprises a flat scanning element 2 to be continuously rotated about a first axis 3, shown here as being vertical, and simultaneously nodded about a second axis 4, shown here as being horizontal. While our invention is shown here embodied in an optical scanning system in which scanning element 2 is provided with an elliptical mirror scanning surface 5, it will be readily understood that our invention is equally applicable to other remote object locating systems, such as a radar system, in which the scanning element 2 would form a part of the radar antenna assembly.

A yoke member 6 is provided having spaced apart arms 7 and 8 with bearings 9 and 10 respectively arranged therein intermediate their ends. The upper ends of the arms 7 and 8 of the yoke member 6 join in an upper gimbal bearing 11 while the lower ends of arms 7 and 8 are mounted on a lower ring-shaped gimbal bearing assembly 12. A supporting frame is provided having vertically spaced apart lower and upper portions 13 and 14, lower bearing assembly 12 being mounted on lower frame portion 13 and thus supporting yoke member 6 for rotation about vertical axis 3. Scanning element 2 is provided with a pair of shaft members 15 and 16 disposed along a transverse axis intermediate its ends, shaft members 15 and 16 being respectively journaled in bearings 9 and 10 of arms 7 and 8 of yoke member 6 thereby pivotally supporting scanning element 2 between the arms 7 and 8 of yoke member 6 for limited nodding motion about horizontal axis 4.

A three dimensional eccentric cam 18 is provided disposed between arms 7 and 8 of yoke member 6 and above scanning element 2, cam 18 being mounted on shaft 19 disposed on vertical axis 3 and rotatably journaled within gimbal bearing 11. It is thus seen that cam 18 is mounted concentric with gimbal bearing 11 for rotation about the vertical axis 3. Shaft 19 upon which three dimensional cam 18 is mounted has an extension portion 20 rotatably journaled in bearing 21 mounted in upper frame portion 14. It is thus seen that the bearing 21 rotatably supports both shaft 19 and gimbal bearing 11 and thus in turn yoke member 6 for rotation about vertical axis 3.

Scanning element 2 has an arm 22 extending upwardly therefrom on its side remote from mirror surface 5 and generally adjacent horizontal axis 4. Arm 22 rotatably supports cam follower roller 23 for rotation about an axis vertical with respect to the plane of scanning element 2, roller 23 being positioned at the outer end of arm 22 and thus spaced from horizontal axis 4, as shown. Another cam follower roller 24 is mounted generally in the plane of scanning element 2, being seated in a suitable recess 25 formed therein and rotatably supported by bearings 26 for rotation about an axis at right angles to the horizontal axis 4. Roller 24 is spaced from the horizontal axis 4 by approximately the same distance as the spacing of roller 23 from the horizontal axis 4. It will be seen that the three dimensional eccentric cam 18 has its diametrically opposite surfaces engaged between the cam follower rollers 23 and 24 and thus that rotation of cam 18 about vertical axis 3 will cause scanning element 2 to nod about horizontal axis 4 between the positions shown in solid and dashed lines in FIG. 2.

A pair of gears 28 and 29 are respectively mounted on shaft extension 20 of shaft 19 and on the exterior of gimbal bearing 11, gears 28 and 29 being respectively arranged in driving engagement with another pair of gears 30 and 31 connected together by a pin 32 and freely rotating on shaft 33 mounted on upper frame portion 14. One gear of one of the pairs of gears has a different number of teeth than the other gear of its pair with the other pair of gears having an equal number of teeth. Thus, in an actual scanning apparatus constructed in accordance with our invention, gear 30 was provided with eigthy-one teeth, gear 31 was provided with eighty teeth, and gears 28 and 29 respectively were provided with eighty teeth. It is thus seen that shaft 19 and three dimensional cam 18 are caused to rotate at a speed different from the rotational speed of gimbal bearing 11 by virtue of the differential gearing comprising gears 28, 29, 30 and 31 and thus that yoke member 6 and scanning element 2 will be caused to rotate about vertical axis 3 with scanning element 2 being simultaneously nodded about horizontal axis 4.

Gear 31 is in turn driven by an idler gear 34 mounted on a shaft 35 supported by bearing 36 in upper frame portion 14 and another bearing 37 in frame portion 38. Idler gear 34 is in turn driven by pinion 39 attached to shaft 40 of motor 41, preferably a synchronous motor, which is mounted on frame portion 38 in any suitable manner, as by screws 42.

In the illustrated embodiment, as shown in FIG. 2, a transparent window 43 is provided closing the space defined between upper and lower frame portions 13 and 14 and a counterweight 61 is mounted on scanning element 2 on the side thereof opposite from arm 22 to counterbalance the mass thereof. The optical image scanned by mirror surface 5 is viewed through the central opening 44 in lower gimbal bearing 12; since the central opening 44 in lower gimbal bearing 12 is cylindrical, its projection on mirror surface 5 is elliptical thus dictating the elliptical configuration of scanning element 2 and mirror surface 5.

In the above referred to scanning apparatus constructed in accordance with our invention, gears 30 and 31 were driven at a speed of 2400 r.p.m. in turn driving gear 29, gimbal bearing 11 and yoke 6 at a speed of 2400 r.p.m. By virtue, however, of the provision of 81 teeth on gear 30 driving the 80 tooth gear 28 attached to shaft 19 and cam 18, cam 18 was driven at a speed of 2430 r.p.m., it being seen that there is thus a difference of 30 r.p.m. between the rotational speeds of gimbal 11 and yoke 6 and the three dimensional cam 18; this net difference of 30 r.p.m. between the speeds of cam 18 and yoke 6 represents a rotational speed of 30 r.p.m. of cam 18 with respect to yoke 6 thus imparting the limited nodding motion to scanning element 2 about horizontal axis 4 at that rate of speed. In the actual apparatus constructed in accordance with our invention, the scanning element 2 was nodded through an angle 85 of twenty (20°) degrees, thus providing a total forty (40°) degree vertical scan with the window 43 providing a ninety (90°) degree horizontal field of view. With its rotational speeds described above, i.e., 2400 r.p.m. for the yoke member 6 and 2430 r.p.m. for the cam 18, scanning element 2 was thus scanned through a forty degree (40°) vertical by ninety degree (90°) horizontal field of view at one frame per second. It will be readily seen that the two cam followers 23 and 24 are required for positive displacement between the cam 18 and the scanning element 2.

Referring now to FIGS. 3 and 4 in addition to FIGS. 1 and 2, we have provided means for sensing the positions of the scanning element 2 in both the plane of its nodding motion and the plane of its rotation, the resulting signals being respectively employed in controlling the deflection of a cathode ray tube. The positions of scanning element 2 in the plane of its nodding motion, i.e., about horizontal axis 4, are continuously sensed by means of a rotary potentiometer 45 having its sliding element 46 driven by motor 41 at the same rotational speed as cam 18 through a suitable gear train 47. It will be seen that potentiometer 45 is mounted on frame portion 38 in any suitable manner, as by screws 48, with its shaft 49 to which its sliding element 46 is connected, extending upwardly therethrough. Gear train 47 includes gear 50 driven by pinion 39 on motor shaft 40, gear 50 being mounted on shaft 51 journaled in bearings 52 and 53 in frame portions 38 and 14 respectively. Shaft 51 in turn has a pinion 54 secured thereto driving gear 55 on shaft 56 journaled in bearings 57 and 58 in frame portions 14 and 38. Shaft 56 in turn has a pinion 59 secured thereto driving gear 60 attached to potentiometer shaft 49. It will be readily understood that the ratio of the gears 50, 55 and 60 and pinions 54 and 59 comprising gear train 47 are suitably chosen to drive shaft 49 of potentiometer 45 and thus its sliding element 46 at the same speed as the difference of speeds of cam 18 and gimbal 11, i.e., 30 r.p.m.

Two opposite points 62 and 63 on resistance element 64 of potentiometer 45 are connected respectively to a suitable source of deflection potential 65 and ground with sliding element 46 being connected to vertical deflection element 66 of cathode ray tube 67. It will now be seen that rotation of the sliding element 46 at the same speed as cam 18 continuously derives a deflection voltage responsive to the positions of scanning element 2 in the plane of its nodding motion, i.e., about horizontal axis 4, this continuously varying deflection voltage being applied to the vertical deflection element 66 of cathode ray tube 67 thereby to provide vertical deflection of the electron beam. Assuming momentarily that maximum upward vertical deflection of the electron beam of cathode ray tube 67 is provided with sliding element 46 of potentiometer 45 at point 62 on resistance element 64, and that maximum downward vertical deflection is provided with sliding element 46 as point 63, is will be seen that one complete cycle of nodding motion of scanning element 42 about horizontal axis 4 will result in one complete downward and upward cycle of vertical deflection of the electron beam of cathode ray tube 67.

Cathode ray tube 67 has it horizontal deflection element 68 coupled to a conventional horizontal sweep generator 69. Initiation and termination of the horizontal sweep voltage 70 is respectively responsive to signals provided by a pair of reluctance pick ups 71 and 72. Reluctance pick ups 71 and 72 respectively have their coils 73 and 74 mounted in angularly spaced apart relationship on frame member 75 which supports lower gimbal bearing 12. A slug 76 of magnetic material is provided on ring member 78 of lower gimbal bearing 12, magnetic slug 76 cooperating with coils 73 and 74 of reluctance pick ups 71 and 72 to provide signals responsive to two predetermined spaced apart angular positions of yoke member 8 and thus of scanning element 2 in the plane of its rotation about vertical axis 3. It is thus seen that signals 79 and 80 are respectively provided by reluctance pick ups 71 and 72 responsive to rotational motion of scanning element 2 through a predetermined horizontal field of view, i.e., ninety (90°) degrees in the illustrated embodiment, signal 79 from pick up 71 sensing entry of scanning element 2 into the desired horizontal field of view and signal 80 sensing departure of the scanning element 2 from the desired horizontal field of view. Since is it desired that the electron beam of cathode ray tube 67 be scanned horizontally responsive to each scanning of element 2 throughout its horizontal field of view, reluctance pick up 71 is coupled to horizontal sweep generator 69 so that its signal 79 initiates the horizontal sweep 70 and reluctance pick up 72 is likewise coupled to horizontal sweep generator 69 so that its signal 80 terminates horizontal sweep 70. It may further be found desirable to clip the top portions 81 and 82 of signals 79 and 80 from scanning elements 71 and 72, as is well known in the art. A system suitable for providing the horizontal sweep 70 and initiating and terminating the same respectively responsive to the signals from coils 73 and 74 of reluctance pick ups 71 and 72 is shown in co-pending application of K. L. DeBrosse and W. J. Williams, Serial Number 747,161 filed July 8, 1958, now Patent No. 2,931,940, issued April 5, 1960 and assigned to the asignee of the present application. It will now be seen that each rotation of yoke member 8 and scanning element 2 about vertical axis 3 provides one horizontal sweep of the electron beam of cathode ray tube 67 while each cycle of nodding motion of scanning element 2 about horizontal axis 4 provides one complete downward and upward vertical deflection of the electron beam. The electron gun 83 of cathode ray tube 67 which provides the electron beam may be coupled to the apparatus which receives the light reflected downwardly through central opening 44 in lower gimbal bearing 12 from mirror surface 5, this apparatus however not forming a part of our present invention.

It will now be readily seen that we have provided a simple and compact mechanism for providing the desired scanning motion, the apparatus being capable of smooth high speed scanning action without undesirable vibratory effects, and being considerably smaller and lighter than prior scanning apparatus of this type. It will further readily be apparent that out apparatus is adaptable in both the horizontal and vertical planes and further, as indicated above, that it is equally applicable to other types of scanning elements, such as radar antennae.

It will also be seen that we have provided simple means for sensing the positions of the scanning element of our improved scanning apparatus in both its horizontal and vertical planes of motion, such position sensing means providing the requisite signals for deflection of the electron beam in a cathode ray tube without requiring the use of slip rings.

While we have described above the principles of our invention in connection with specific apparatus, it is to be clearly understood that this description is made only by way of example and not as a limitation to the scope of our invention.

What is claimed is:

1. Scanning apparatus for continuously rotating an element about a first axis and simultaneously imparting a limited nodding motion to said element about a second axis at right angles to said first axis, said apparatus comprising: means rotatable about said first axis for supporting said element for nodding motion about said second axis; an eccentric cam rotatable about said first axis and cooperatively engaging said element for imparting said nodding motion thereto; and means connected respectively to rotate said first means and said cam means at different speeds.

2. Scanning apparatus for continuously rotating an element about a first axis and simultaneously imparting a limited nodding motion to said element about a second axis at right angles to said first axis, said apparatus comprising: first means for supporting said element for nodding motion about said second axis; second means for supporting said first means for rotation about said first axis; an eccentric cam rotatable about said first axis and cooperatively engaging said element for imparting nodding motion thereto; and differential means operatively connected to said first means and said cam means for respectively rotating the same at different speeds.

3. Scanning apparatus for continuously rotating an element about a first axis and simultaneously imparting a limited nodding motion to said element about a second axis at right angles to said first axis, said apparatus comprising: first means for supporting said element for nodding motion about said second axis; second means for supporting said first means for rotation about said first axis; three dimensional cam means rotatable about said first axis and cooperatively engaging said element for imparting said nodding motion thereto; and means including differential gearing operatively connected to said first means and to said cam means for respectively rotating the same at different speeds.

4. Scanning apparatus for continuously rotating an element about a first axis and simultaneously imparting a limited nodding motion to said element about a second axis at right angles to said first axis, said apparatus comprising: a supporting member having said element pivotally connected thereto for nodding motion about said second axis; bearing means supporting said member for rotation about said first axis; a cam cooperatively engaging said element for imparting nodding motion thereto responsive to rotation thereof; bearing means supporting said cam for rotation about said first axis; and differential gearing operatively connected to said member and said cam for respectively rotating the same at different speeds.

5. Scanning apparatus for continuously rotating an element about a first axis and simultaneously imparting a limited nodding motion to said element about a second axis at right angles to said first axis, said apparatus comprising: a supporting member rotatable about said first axis and having said element pivotally connected thereto for nodding motion about said second axis; a cam cooperatively engaging said element for imparting nodding motion thereto responsive to rotation thereof; a shaft disposed in said first axis and having said cam mounted thereon, said shaft being concentrically journaled in a part of said member; and differential gearing operatively connected to said shaft and said member part for respectively rotating the same at different speeds.

6. Scanning apparatus for continuously rotating an element about a first axis and simultaneously imparting a limited nodding motion to said element about a second axis at right angles to said first axis, said apparatus comprising: a supporting member rotatable about said first axis and having said element pivotally connected thereto for nodding motion about said second axis; a part of said member forming a gimbal bearing concentric with said first axis; a shaft journaled in said gimbal bearing for rotation in said first axis; a cam mounted on said shaft and cooperatively engaging said element for imparting nodding motion thereto responsive to rotation thereof; bearing means supporting said shaft and gimbal bearing for respective rotation in said first axis; and differential gearing operatively connected to said shaft and said gimbal bearing for respectively rotating the same at different speeds.

7. Scanning apparatus for continuously rotating an element about a first axis and simultaneously imparting a limited nodding motion to said element about a second axis at right angles to said first axis, said apparatus comprising: a supporting member having said element pivotally connected thereto for nodding motion about said second axis; bearing means supporting said member for rotation about said first axis; a part of said member forming a gimbal bearing concentric with said first axis; a shaft journaled in said gimbal bearing for rotation in said first axis; a cam mounted on said shaft and cooperatively engaging said element for imparting nodding motion thereto responsive to rotation thereof; bearing means supporting said shaft and gimbal bearing for respective rotation in said first axis; and differential gearing operatively connected to said shaft and said gimbal bearing for respectively rotating the same at different speeds.

8. Scanning apparatus for continuously rotating an element about a first axis and simultaneously imparting a limited nodding motion to said element about a second axis at right angles to said first axis, said apparatus comprising: a frame; a supporting member having said element pivotally connected thereto for nodding motion about said second axis; bearing means supporting said member on a part of said frame for rotation about said first axis; a part of said member forming a gimbal bearing concentric with said first axis; a shaft journaled in said gimbal bearing for rotation about said first axis; a cam mounted on said shaft and cooperatively engaging said element for imparting nodding motion thereto responsive to rotation thereof; bearing means supporting said shaft and gimbal bearing on another part of said frame for respective rotation about said first axis; and differential gearing operatively connected to said shaft and to said member part for respectively rotating the same at different speeds.

9. Scanning apparatus for continuously rotating an element about a first axis and simultaneously imparting a limited nodding motion to said element about a second axis at right angles to said first axis, said apparatus comprising: a yoke member having a pair of spaced apart arms; a gimbal bearing concentric with said first axis and joining said arms at one end; a bearing formed at the other end of said arms supporting said yoke member for rotation in said first axis; said element being pivotally supported between said yoke member arms for nodding motion about said second axis; a cam mounted on a shaft journaled in said gimbal bearing for rotation about said first axis; a cam mounted on said shaft and operatively engaging said element for imparting nodding motion thereto responsive to rotation thereof; a bearing rotatably supporting an end of said shaft extending beyond said gimbal bearing on the side thereof remote from said yoke member; and differential gearing operatively connected to said shaft and to said gimbal bearing for respectively rotating the same at different speeds.

10. Scanning apparatus for continuously rotating an element about a first axis and simultaneously imparting a limited nodding motion to said element about a second axis at right angles to said first axis, said apparatus comprising: a yoke member having a pair of spaced apart arms; a gimbal bearing concentric with said first axis and joining said arms at one end; a bearing formed at the other end of said arms supporting said yoke member for rotation about said first axis; said element being pivotally supported between said yoke member arms for nodding motion about said second axis; a shaft journaled in said gimbal bearing for rotation about said first axis; a cam mounted on said shaft and operatively engaging said element for imparting nodding motion thereto responsive to rotation thereof; a bearing rotatably supporting an end of said shaft extending beyond said gimbal bearing on the side thereof remote from said yoke member; a first pair of concentric gears mounted respectively on said shaft and said gimbal bearing for respectively rotating said shaft and said yoke member about said first axis; a second pair of concentric gears operatively connected to said first pair of gears; one gear of one of said pairs of gears having a different number of teeth than the other gear of said one pair and the gears of the other pair having equal numbers of teeth whereby said shaft and said yoke member are rotated at different speeds; and power means for simultaneously driving said second pair of gears.

11. Scanning apparatus for continuously rotating an element about a first axis and simultaneously imparting a limited nodding motion to said element about a second axis at right angles to said first axis, said apparatus comprising: a yoke member having a pair of spaced apart arms; a gimbal bearing concentric with said first axis and joining said arms at one end; a bearing formed at the other end of said arms supporting said yoke member for rotation in said first axis; said yoke member arms respectively having bearings intermediate said ends thereof, said bearings being concentric with said second axis; said element being planar and having shaft members extending respectively on each side and disposed on a transverse axis thereof intermediate its ends, said shaft members being respectively journaled in said yoke member bearings thereby supporting said element between said yoke member arms for nodding motion about said second axis; a three dimensional cam disposed between said yoke member arms; a shaft journaled in said gimbal bearing for rotation about said first axis and having said cam mounted thereon; a pair of cam followers mounted on said element and respectively cooperatively engaging diametrically opposite points on the surface of said cam whereby rotation of said cam imparts limited nodding motion to said element; a bearing rotatably supporting an end of said shaft extending beyond said gimbal bearing on the side thereof remote from said yoke member; and differential gearing operatively connected to said shaft and to said gimbal bearing for respectively rotating the same at different speeds.

12. Scanning apparatus for continuously rotating an element about a first axis and simultaneously imparting a limited nodding motion to said element about a second axis at right angles to said first axis, said apparatus comprising: a yoke member having a pair of spaced apart arms; a gimbal bearing concentric with said first axis and joining said arms at one end; a bearing formed at the other end of said arms supporting said yoke member for rotation in said first axis; said yoke member arms respectively having bearings intermediate said ends thereof, said bearings being concentric with said second axis; said element being planar and having shaft members extending respectively on each side and disposed on a transverse axis thereof intermediate its ends, said shaft members being respectively journaled in said yoke member bearings thereby supporting said element between said yoke member arms for nodding motion about said second axis; a three dimensional eccentric cam disposed between said yoke member arms; a shaft journaled in said gimbal bearing for rotation about said first axis and having said cam mounted thereon; an arm extending outwardly from one surface of said element; a first cam follower roller supported by said arm for rotation about an axis vertical with respect to the plane of said element; a second cam follower roller mounted generally in the plane of said element for rotation about an axis at right angles to said second axis, said second roller being spaced from said second axis; said cam having diametrically opposite points on its surface cooperatively engaged between said rollers whereby rotation of said cam imparts limited nodding motion to said element; a bearing rotatably supporting an end of said shaft extending beyond said gimbal bearing on the side thereof remote from said yoke member; and differential gearing operatively connected to said shaft and to said gimbal bearing for respectively rotating the same at different speeds.

13. Scanning apparatus for continuously rotating a planar element about a vertical axis and simultaneously imparting a limited nodding motion thereto about a horizontal axis, said apparatus comprising: a frame having vertically spaced apart upper and lower portions; a yoke member having a pair of horizontally spaced apart arms; a gimbal bearing concentric with said vertical axis and joining the upper ends of said arms; a thrust bearing formed at the bottom ends of said arms supporting yoke member on said lower frame portion for rotation about said vertical axis; said yoke member arms respectively having bearings intermediate said ends thereof, said bearings being concentric with said horizontal axis; shaft members extending respectively on each side of said element and disposed on a transverse axis thereof intermediate its ends, said shaft members being respectively journaled in said yoke member bearings thereby supporting said element between said yoke member arms for nodding motion about said horizontal axis; an eccentric three dimensional cam disposed between said yoke member arms above said element; a shaft journaled in said gimbal bearing for rotation about said vertical axis and having said cam mounted thereon; an arm extending upwardly from one surface of said element adjacent said transverse axis; a first cam follower roller supported by said arm adjacent its end for rotation about an axis vertical with respect to the plane of said element; a second cam follower roller mounted generally in the plane of said element for rotation about an axis at right angles to said transverse axis, said second roller being spaced from said transverse axis by an amount approximately equal to the spacing of said first roller therefrom; said cam having diametrically opposite points on its face cooperatively engaged between said rollers whereby rotation of said cam imparts limited nodding motion to said element proportional to the throw of said cam; a bearing on said upper portion of said frame rotatably supporting an end of said shaft extending beyond said gimbal bearing on the side thereof remote from said yoke member; a first pair of concentric gears mounted respectively on said shaft extension and said gimbal bearing for respectively rotating said shaft and said yoke member about said first axis; a second pair of concentric gears rotatably supported on said upper frame portion and operatively connected to drive said first pair of gears; one gear of one of said pair of gears having a different number of teeth than the other gear of said one pair and the gears of the other pair having equal numbers of teeth whereby said shaft and yoke member are rotated at different speeds; and power means mounted on said upper frame portion operatively connected simultaneously to drive said second pair of gears.

References Cited in the file of this patent

UNITED STATES PATENTS

| | | |
|---|---|---|
| 2,151,917 | Hyland | Mar. 28, 1939 |
| 2,272,125 | Loone | Feb. 3, 1942 |
| 2,410,827 | Longsroth | Nov. 12, 1946 |
| 2,410,831 | Maybarduk | Nov. 12, 1946 |
| 2,653,185 | Lubcke | Sept. 22, 1953 |
| 2,836,812 | Fyler | May 27, 1958 |
| 2,840,817 | Walters | June 24, 1958 |
| 2,855,521 | Blackstone | Oct. 7, 1958 |
| 2,931,940 | De Brosse | Apr. 5, 1960 |